(12) United States Patent
Liu et al.

(10) Patent No.: US 11,997,523 B2
(45) Date of Patent: May 28, 2024

(54) EFFICIENT TRIGGER-BASED MULTI-USER UPLINK TRANSMISSIONS IN WIRELESS LOCAL AREA NETWORKS

(71) Applicant: MediaTek Singapore Pte. Ltd., Singapore (SG)

(72) Inventors: Jianhan Liu, San Jose, CA (US); Shengquan Hu, San Jose, CA (US); Yongho Seok, San Jose, CA (US); Thomas Edward Pare, Jr., San Jose, CA (US); Kai Ying Lu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 193 days.

(21) Appl. No.: 17/506,085

(22) Filed: Oct. 20, 2021

(65) Prior Publication Data
US 2022/0132351 A1 Apr. 28, 2022

Related U.S. Application Data

(60) Provisional application No. 63/214,284, filed on Jun. 24, 2021, provisional application No. 63/105,376, filed on Oct. 26, 2020.

(51) Int. Cl.
*H04W 24/10* (2009.01)
*H04L 1/00* (2006.01)
(Continued)

(52) U.S. Cl.
CPC .......... *H04W 24/10* (2013.01); *H04L 1/0013* (2013.01); *H04W 52/245* (2013.01); *H04W 84/12* (2013.01)

(58) Field of Classification Search
CPC ... H04W 24/10; H04W 52/245; H04W 84/12; H04W 72/23; H04W 72/0453;
(Continued)

(56) References Cited

U.S. PATENT DOCUMENTS

| 10,257,833 B2 * | 4/2019 | Huang ................. H04L 5/0071 |
| 2016/0112899 A1 * | 4/2016 | Kenney ................ H04L 5/0053 370/338 |

(Continued)

FOREIGN PATENT DOCUMENTS

| CN | 102017758 A | * | 4/2011 | .......... H04W 72/042 |
| TW | 201735572 A | * | 10/2017 | |

(Continued)

OTHER PUBLICATIONS

European Patent Office, Extended European Search Report for European Patent Application No. 21204174.3, dated Mar. 25, 2022.
(Continued)

*Primary Examiner* — Ayaz R Sheikh
*Assistant Examiner* — Louis Samara
(74) *Attorney, Agent, or Firm* — Han IP PLLC; Andy M. Han

(57) ABSTRACT

Various examples pertaining to efficient trigger-based (TB) multi-user (MU) uplink (UL) transmissions in wireless local area networks (WLANs) are described. A stations (STA) receives a trigger frame from an access point (AP), with the trigger frame assigning one or more resource units (RUs) corresponding to one or more subchannels of a plurality of subchannels. The STA then performs a transmission using the assigned one or more RUs responsive to receiving the trigger frame. In an event that at least one subchannel of the plurality of subchannels is detected as being busy, the one or more subchannels may include a subset (e.g., some but not all) of the plurality of subchannels.

20 Claims, 13 Drawing Sheets

(51) Int. Cl.
*H04W 52/24* (2009.01)
*H04W 84/12* (2009.01)

(58) Field of Classification Search
CPC ............ H04W 74/0816; H04W 28/06; H04W 72/042; H04W 72/12; H04L 1/0013; H04L 5/003; H04L 5/0053
See application file for complete search history.

(56) References Cited

U.S. PATENT DOCUMENTS

| | | | |
|---|---|---|---|
| 2017/0311289 A1* | 10/2017 | Kim | H04W 74/0816 |
| 2018/0310310 A1* | 10/2018 | Huang | H04L 5/0071 |
| 2020/0059973 A1* | 2/2020 | Ahn | H04W 72/12 |
| 2021/0288768 A1* | 9/2021 | Yang | H04L 5/0044 |
| 2022/0338057 A1* | 10/2022 | Shellhammer | H04L 5/0085 |
| 2022/0376833 A1* | 11/2022 | Huang | H04L 1/1861 |

FOREIGN PATENT DOCUMENTS

| | | |
|---|---|---|
| WO | WO 2017120418 A1 | 7/2017 |
| WO | WO 2017221186 A1 | 12/2017 |
| WO | WO-2022014192 A1 * | 1/2022 ............ H04W 52/16 |

OTHER PUBLICATIONS

Taiwan Intellectual Property Office, Office Action for Taiwan Patent Application No. 110139176, dated Jan. 4, 2022.

\* cited by examiner

500

EHT TB PPDU FORMAT FOR AUTO-DETECTION OR EHT PPDU WITH/WITHOUT RU/MRU DOWNSIZING

| L-STF | L-LTF | L-SIG | RL-SIG | U-SIG1 | U-SIG2 | EHT-STF | EHT-LTF | DATA |

| L-STF | L-LTF | L-SIG | RL-SIG | U-SIG1 | U-SIG2 | TB-SIG | EHT-STF | EHT-LTF | DATA |

FIG. 7

EFFICIENT TRIGGER-BASED MULTI-USER UPLINK TRANSMISSIONS IN WIRELESS LOCAL AREA NETWORKS

CROSS REFERENCE TO RELATED PATENT APPLICATION

The present disclosure is part of a non-provisional patent application claiming the priority benefit of U.S. Provisional Patent Application Nos. 63/105,376 and 63/214,284, filed 26 Oct. 2020 and 24 Jun. 2021, respectively, the contents of which being incorporated by reference in their entirety.

TECHNICAL FIELD

The present disclosure is generally related to wireless communications and, more particularly, to efficient trigger-based (TB) multi-user (MU) uplink (UL) transmissions in wireless local area networks (WLANs).

BACKGROUND

Unless otherwise indicated herein, approaches described in this section are not prior art to the claims listed below and are not admitted as prior art by inclusion in this section.

For TB MU UL transmissions, a triggered station (STA) can only transmit using an exact resource unit (RU) or an aggregate of multiple RUs (multi-RU or MRU) assigned in a trigger frame. In next-generation wireless communications such as those implemented in WLANs based on the Institute of Electrical and Electronics Engineers (IEEE) 802.11 ac/ax standards, an access point (AP) that sends the trigger frame does not know the clear channel assessment (CCA) status of the target triggered STAs. Thus, a STA that is allocated a RU/MRU in the trigger frame cannot transmit any signal if the CCA of one or more 20 MHz subchannels within its allocated RU/MRU is not clear. For example, when a STA is triggered for UL orthogonal frequency-division multiple access (OFDMA) transmission with an assigned 996-tone RU (RU996), the STA would not participate in the UL OFDMA transmission in case CCA indicates a second 20 MHz subchannel is busy. That is, in IEEE 802.11 ax, when the AP configures channel sensing (CS) required (e.g., by setting "CS Required=1"), then the triggered STA is required to perform CCA per-20 MHz subchannel before responding to the trigger frame. If any portion of the allocated frequency resource is detected to be busy during the CCA, then the STA would not transmit any TB physical-layer protocol data unit (PPDU). As can been, spectrum usage efficiency would be degraded under this protocol. Therefore, there is a need for a solution for efficient TB MU UL transmissions in WLANs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to efficient TB MU UL transmissions in WLANs. Under various proposed schemes in accordance with the present disclosure, it is believed that issue(s) described herein may be addressed. For instance, if a STA can transmit a 242-tne RU or a 484-tone RU or an aggregate of the 242-tone RU and the 484-tone RU (MRU(242+484)) out of a 996-tone RU when one of the 20 MHz subcarriers is busy, then spectrum efficiency could be enhanced.

In one aspect, a method may involve receiving a trigger frame from an AP, with the trigger frame assigning one or more RUs. The method may also involve performing a transmission using the assigned one or more RUs corresponding to one or more subchannels of a plurality of subchannels responsive to receiving the trigger frame, with the one or more subchannels being a subset of the plurality of subchannels in an event that at least one subchannel of the plurality of subchannels is detected as being busy.

In one aspect, a method may involve transmitting a trigger frame to a STA, with the trigger frame assigning one or more RUs. The method may also involve receiving a transmission from the STA on the assigned one or more RUs corresponding to one or more subchannels of a plurality of subchannels responsive to transmitting the trigger frame, with the one or more subchannels being a subset of the plurality of subchannels in an event that at least one subchannel of the plurality of subchannels is detected as being busy.

In yet another aspect, an apparatus may include a transceiver and a processor coupled to the transceiver. The transceiver may be configured to communicate wirelessly. The processor may receive, via the transceiver, a trigger frame from an AP, with the trigger frame assigning one or more RUs. The processor may perform, via the transceiver, a transmission using the assigned one or more RUs corresponding to one or more subchannels of a plurality of subchannels responsive to receiving the trigger frame, with the one or more subchannels being a subset of the plurality of subchannels in an event that at least one subchannel of the plurality of subchannels is detected as being busy.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 5 is a diagram of an example design in accordance with an implementation of the present disclosure.

FIG. 7 is a diagram of an example design in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

OVERVIEW

Implementations in accordance with the present disclosure relate to various techniques, methods, schemes and/or solutions pertaining to efficient TB MU UL transmissions in WLANs. According to the present disclosure, a number of possible solutions may be implemented separately or jointly. That is, although these possible solutions may be described below separately, two or more of these possible solutions may be implemented in one combination or another.

It is noteworthy that, although examples described herein and illustrated in the figures may show a first RU of size A and a second RU of size B, as in RU A+RU B, various proposed schemes in accordance with the present disclosure may be implemented with RU A+RU B, or vice versa (e.g., RU B+RU A). In other words, the scope of the present disclosure is not limited to the examples presented herein and, rather, also covers variations thereof. For instance, for a multi-RU group (996+484), the order of RUs may be exchanged in different implementations such as, for example, a first RU of size 484 plus a second RU of size 996 in one implementation or, alternatively, a first RU of size 996 plus a second RU of size 484 in another implementation. Moreover, in the present disclosure, aggregated multiple RUs may be interchangeably referred to as "multi-RU" and "MRU". Thus, in the aforementioned example, the multi-RU group (996+484), which is an aggregation of two RUs (namely a 996-tone RU and a 484-tone RU), may be referred to as a multi-RU(996+484) or an MRU(996+484).

Figure 1:
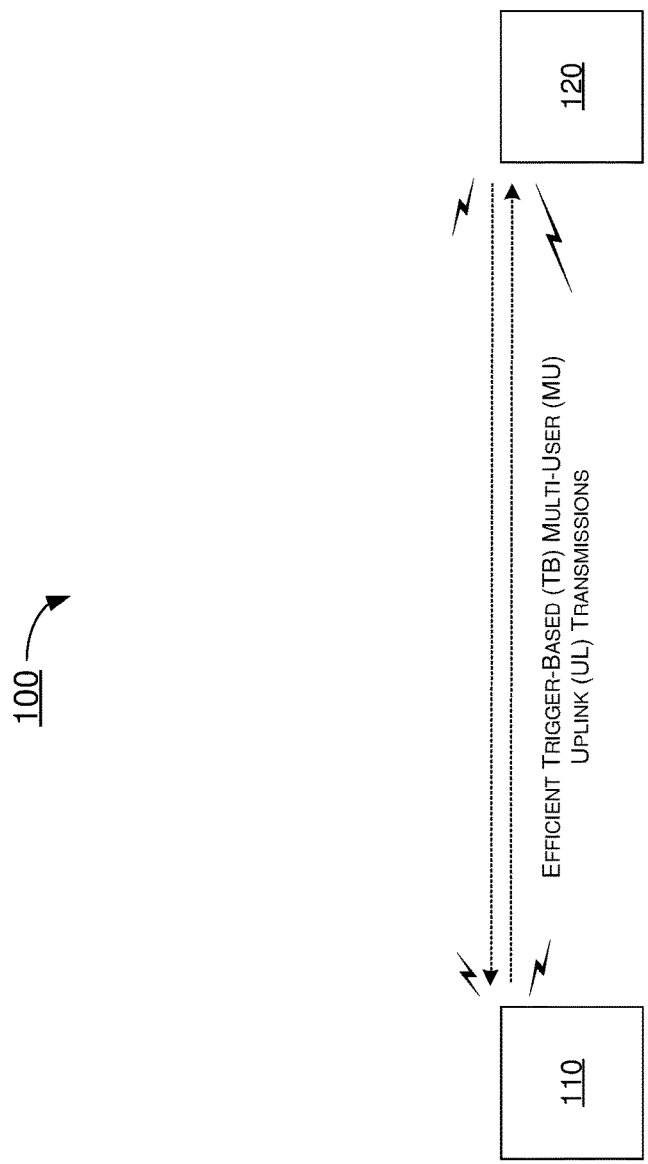
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 13 illustrate examples of implementation of various proposed schemes in network environment 100 in accordance with the present disclosure. The following description of various proposed schemes is provided with reference to FIG. 1~FIG. 13.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a first STA and communication entity 120 may be a second STA, with each of the first STA and second STA being an access point (AP) STA or a non-AP STA. Under various proposed schemes in accordance with the present disclosure, communication entity 110 and communication entity 120 may be configured to perform efficient TB MU UL transmissions in WLANs, as described herein.

Under a proposed scheme in accordance with the present disclosure with respect to enhanced TB UL transmissions, an AP (e.g., communication entity 120) may be aware of the CCA status of its target STA(s) and may allocate a RU/MRU for each of the target STA(s) without violating the CCA status of the target STA(s). Currently, in a multi-user request-to-send (MU-RTS) and clear-to-send (CTS) procedure, the AP cannot tell from the CTS which STA(s) has responded to the MU-RTS with CTS. Thus, whether or not a STA responds with CTS, the AP would continue the transmission anyway. Accordingly, under the proposed scheme, a medium access control (MAC)-layer scheme which is also a CCA status report scheme may be required to avoid no transmission due to subchannel CCA busy. Moreover, under the proposed scheme, a physical (PHY)-layer scheme involving UL subcarrier puncturing or downsized RU/MRU by a STA may be required. For instance, under the PHY-layer scheme, the STA (e.g., communication entity 110) may reduce the size of its allocated RU/MRU for UL TB transmissions. The STA may also signal to the AP about its downsized RU/MRU in TB PPDU. Moreover, the STA may control its transmit power correspondingly.

Figure 2:
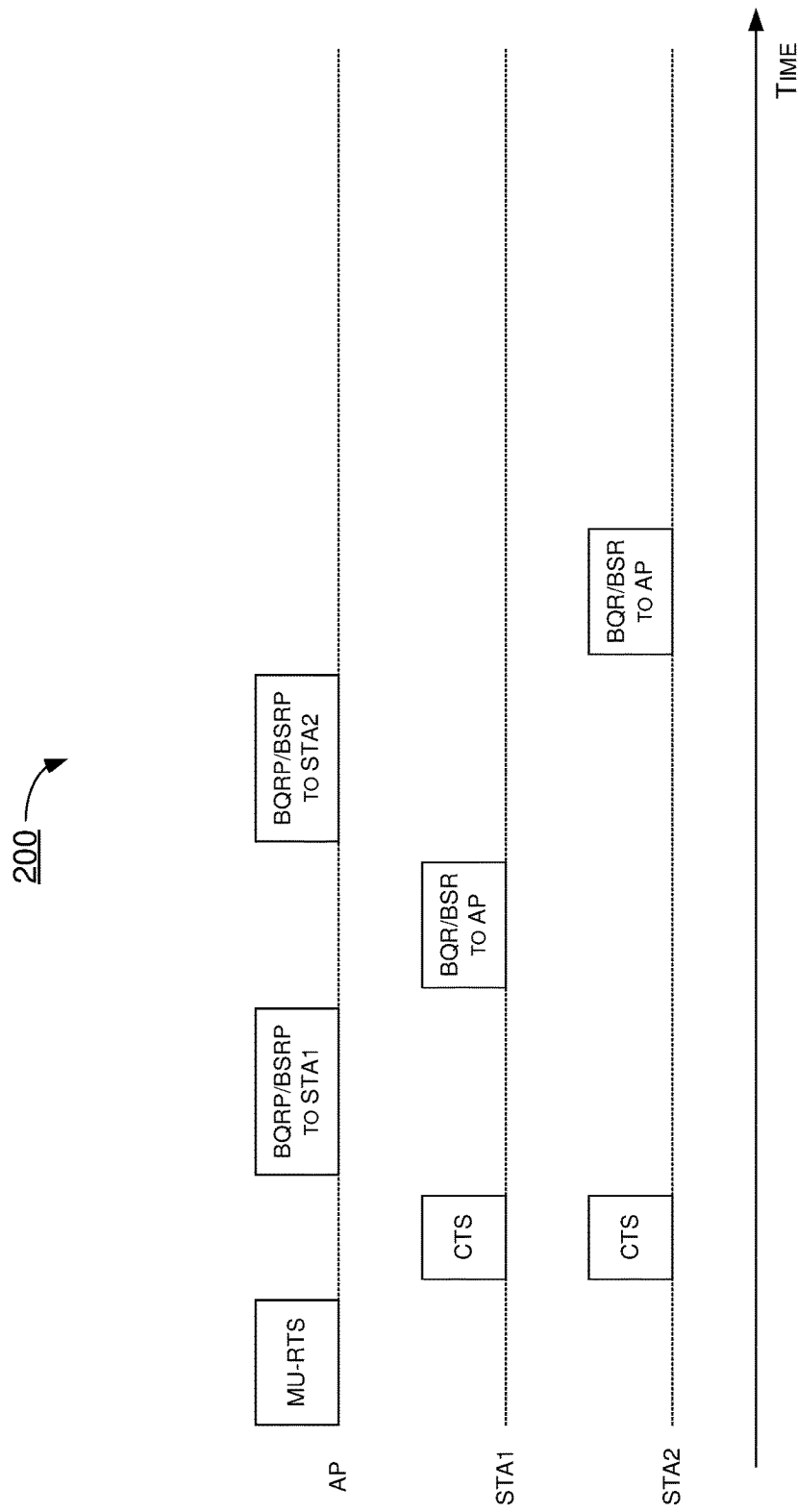
FIG. 2 is a diagram of an example scenario in accordance with an implementation of the present disclosure.

FIG. 2 illustrates an example scenario 200 of an implementation of a proposed scheme regarding CCA status report and period protection setup. Under the proposed scheme, a CCA status report mechanism is needed in order to avoid allocation of a RU/MRU that contains busy CCA subchannel(s) to a STA for TB MU UL transmissions. Current multi-RTS/CTS only sets up a protection period for UL TB transmissions. As for status reporting, a bandwidth query report (BQR) and/or buffer status report (BSR) as well as a bandwidth query report poll (BQRP) and/or buffer status report poll (BSRP) may be used to report CCA status. Referring to FIG. 2, initially an AP may transmit a MU-RTS and, correspondingly, a first STA and a second STA (STA1 and STA2) may each respond with a CTS. Then, the AP may transmit a BQRP/BSRP to STA1 and, in response, STA1 may transmit a BQR/BSR to the AP. Similarly, the AP may transmit a BQRP/BSRP to STA2 and, in response, STA2 may transmit a BQR/BSR to the AP. Under the proposed scheme, the BQR/BSR from each of STA1 and STA2 may include a respective CCA status report so that AP may become aware of the CCA status with respect to each of STA1 and STA2.

Under the proposed scheme, BQR/BSR and BQRP/BSRP frames may be modified and may be referred to status reporting (SR) and status reporting poll (SRP), respectively. The SR may be used to report CCA status of 20 MHz subchannels in addition to the subfields contained in regular BQR and BSR. Under the proposed scheme, in case that CCA status is not a subfield in the SR frame, the SR frame itself may serve as a CCA indicator by sending punctured SR frame. The SR frame may also set up a transmission opportunity (TXOP) period for upcoming TB MU UL transmissions.

Figure 3:
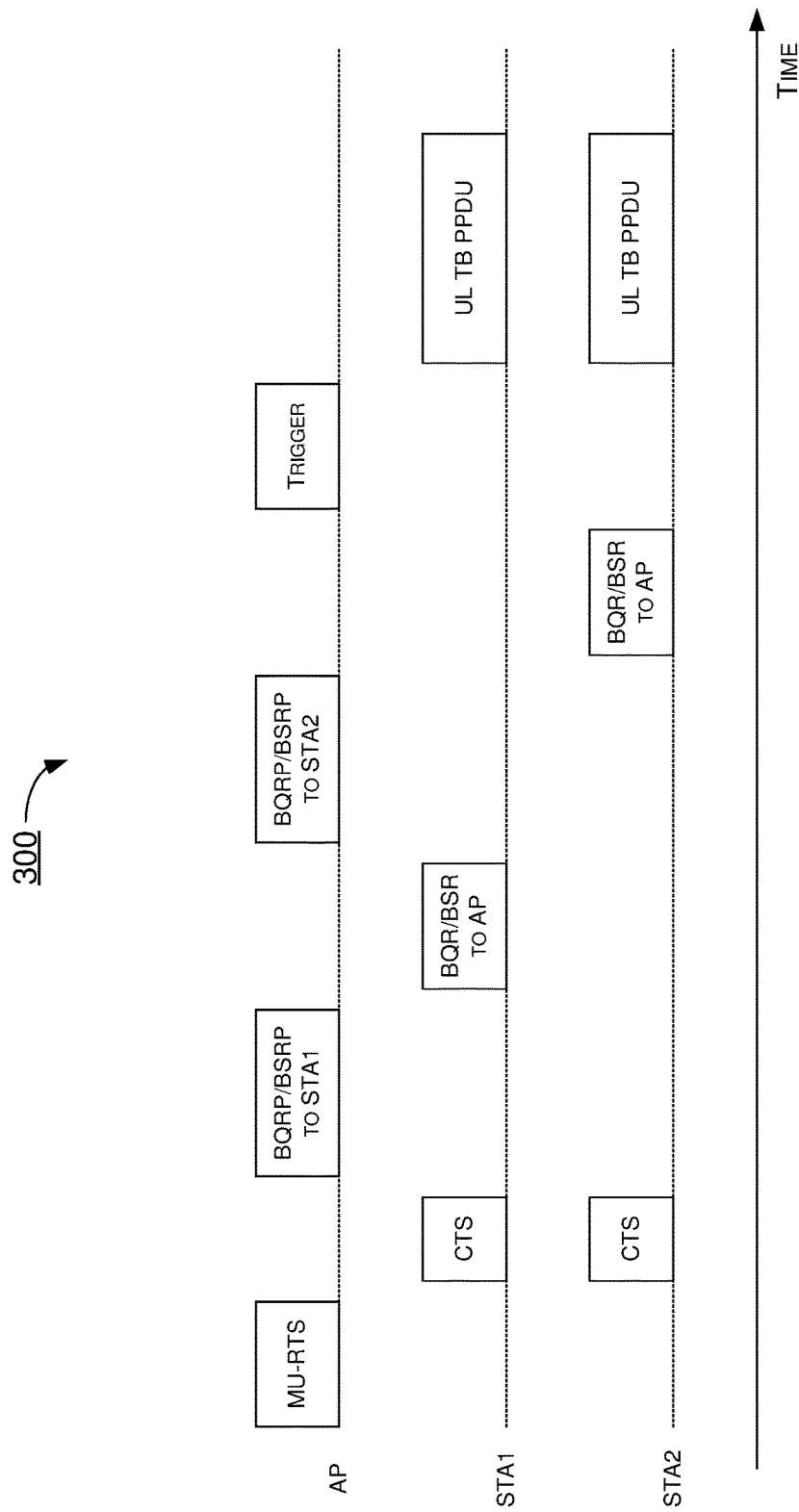
FIG. 3 is a diagram of an example scenario in accordance with an implementation of the present disclosure.

FIG. 3 illustrates an example scenario 300 of an implementation of a proposed scheme regarding enhanced trigger procedure for UL TB transmissions. Under the proposed scheme, TB MU UL transmissions may follow a status report stage. For instance, in a trigger frame transmitted by the AP, the AP may allocate RU/MRU(s) to a STA according to the CCA status report from that STA. Referring to FIG. 3, initially an AP may transmit a MU-RTS and, correspondingly, STA1 and STA2 may each respond with a CTS. Then, the AP may transmit a BQRP/BSRP to STA1 and, in response, STA1 may transmit a BQR/BSR to the AP. Similarly, the AP may transmit a BQRP/BSRP to STA2 and, in response, STA2 may transmit a BQR/BSR to the AP. Subsequently, the AP may transmit a trigger frame to trigger STA1 and STA2 to perform TB MU UL transmissions. The trigger frame may allocate one or more RU/MRUs to each of STA1 and STA2. Accordingly, each of STA1 and STA2 may respectively transmit one or more UL TB PPDUs using its allocated RU/MRUs.

Figure 4:
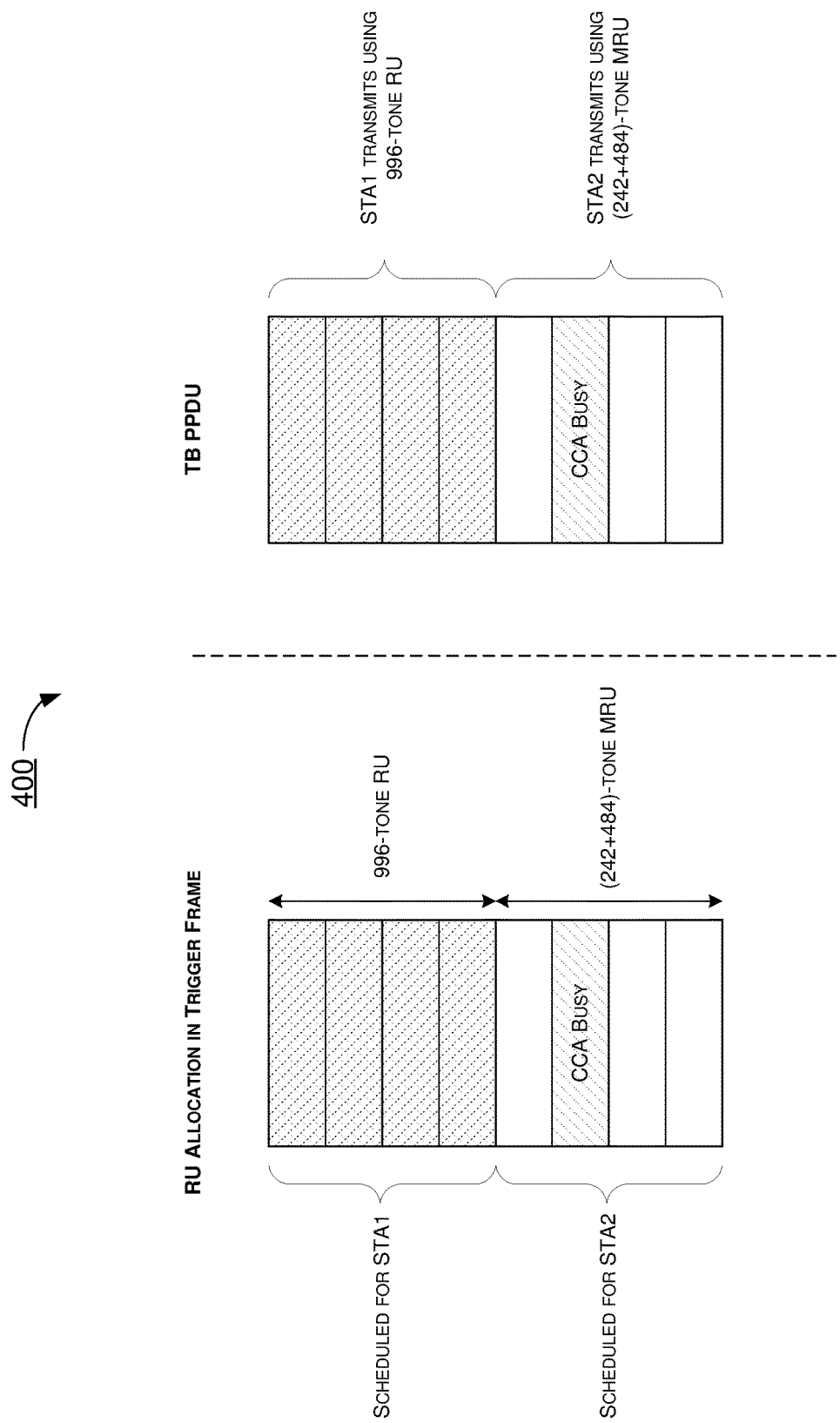
FIG. 4 is a diagram of an example scenario in accordance with an implementation of the present disclosure.

FIG. 4 illustrates an example scenario 400 of an implementation of a proposed scheme regarding enhanced trigger procedure for UL TB transmissions. Referring to FIG. 4, with knowledge of the CCA status of STAs, the AP may allocate in the trigger frame (242+484)-tone MRU to STA2 instead of allocating a 996-tone RU to STA2 when one of the four 20 MHz subchannels is detected to be busy during CCA. Additionally, the AP may allocate another 996-tone RU to STA1 since no subchannel is busy for STA1. Accordingly, STA1 may perform UL TB transmissions using the allocated 996-tone RU, while STA2 may perform UL TB transmissions using the allocated (242+484)-tone MRU.

Under a proposed scheme with respect to STA partial bandwidth or RU/MRU downsizing in accordance with the present disclosure, one or more predefined possible downsized RU/MRUs of each RU/MRU may be known to the AP and STAs. Under the proposed scheme, downsizing granularity may be 20 MHz which corresponds to 20 MHz subchannels and per-20 MHz CCA. For example, for a 996-tone RU, the predefined downsized RU/MRUs may be a subset of a 242-tone RU, a 484-tone RU and a (242+484)-tone MRU. As another example, for a 2×996-tone RU, the predefined downsized RU/MRUs may be a subset of a 996-tone RU, a (484+996)-tone MRU and a (242+484)+996-tone MRU. For instance, when an AP triggers a STA with an allocated 484+3×996-tone MRU, the predefined downsized RU/MRUs may be a subset of a 3×996-tone RU and a 2×996-tone RU.

Under another proposed scheme, efficient TB MU UL transmissions may still be achieved without explicit signaling to indicate RU/MRU downsizing. Under the proposed scheme, an AP may send a trigger frame to trigger an extremely-high-throughput (EHT) TB PPDU. The AP may indicate whether RU/MRU downsizing is allowed or whether UL subchannel puncturing is allowed in a User Information field of the trigger frame. For instance, one bit may be used to indicate whether or not RU/MRU downsizing is enabled (e.g., "1"=enabled and "0"=disabled). The AP may also include in the trigger frame a targeted received signal strength indicator (RSSI) as power control information for the RU/MRU assigned to STA(s). Correspondingly, a STA may transmit on a downsized RU/MRU based on 20 MHz or 40 MHz puncture. The EHT TB PPDU with downsized RU/MRU may utilize the same format as EHT TB PPDU without downsized RU/MRU. FIG. 5 illustrates an example design 500 of an EHT TB PPDU format. Referring to FIG. 5, the EHT TB PPDU format may be used for auto-detection or EHT PPDU with or without RU/MRU downsizing. The EHT TB PPDU with downsized RU/MRU may have one more 20 MHz channel punctured. There may be no explicit RU/MRU downsizing signaling carried in a preamble of the EHT TB PPDU. The AP may detect the downsized RU/MRU automatically for each STA using various auto-detection schemes described below.

Figure 6:
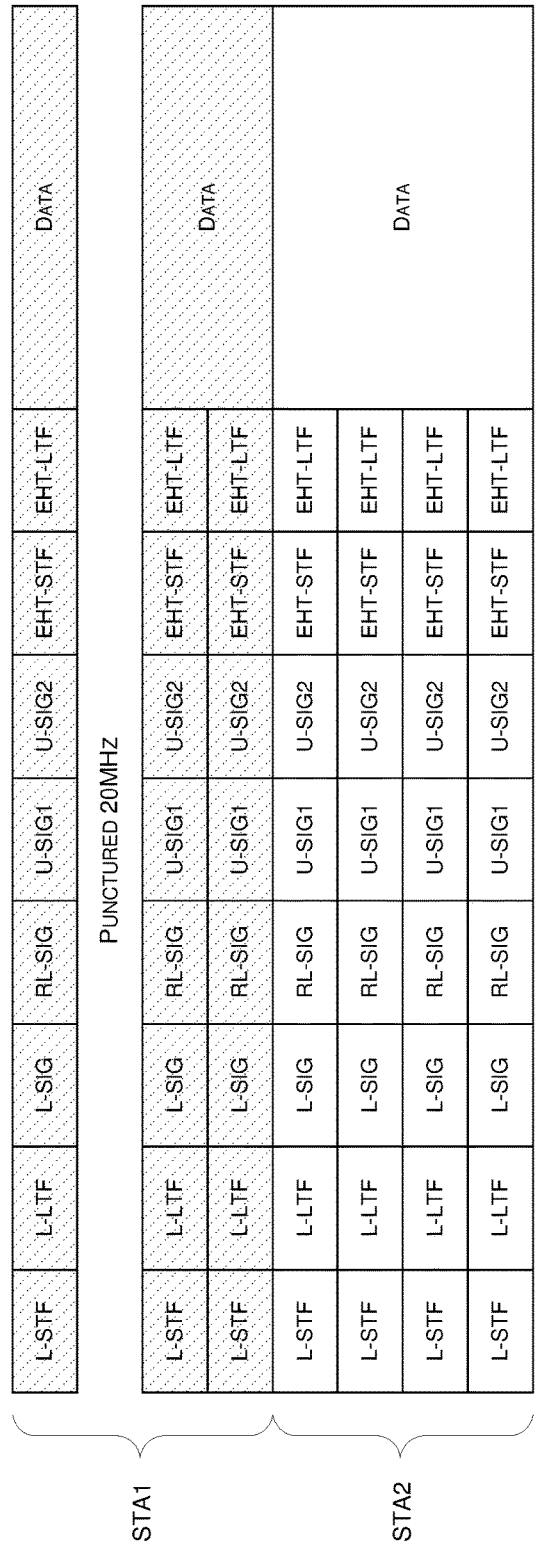
FIG. 6 is a diagram of an example scenario in accordance with an implementation of the present disclosure.

Under a proposed scheme with respect to auto-detection of downsized RU/MRU, an AP may detect downsized RU/MRU using the legacy signal (L-SIG) field, repeated legacy signal (RL-SIG) field and/or universal signal (U-SIG) field in a preamble. Under the proposed scheme, the AP may decode L-SIG and/or U-SIG on every 20 MHz to check a repetition pattern, contents, and the cyclic redundancy check (CRC) of each L-SIG and/or U-SIG. In case the repetition pattern, contents and/or CRC of L-SIG, RL-SIG and/or U-SIG is in error, the AP may assume the corresponding 20 MHz subchannel is punctured. FIG. 6 illustrates an example scenario 600 of an implementation of the proposed scheme. In scenario 600, the AP may trigger two STAs (e.g., STA1 and STA2) for UL OFDMA transmissions. Here, STA1 may be assigned with a first 80 MHz (e.g., the first 996-tone RU) and STA2 may be assigned with a second 80 MHz (e.g., the second 996-tone RU). STA1 may transmit an EHT TB PPDU on a downsized (242+484)-tone MRU. The AP may process the preamble of each 20 MHz and check the content and CRC of the L-SIG, RL-SIG and/or U-SIGs to determine which 20 MHz subchannel is punctured and then determine the downsized RU/MRU based on predefined downsized RU/MRU options. In the example shown in FIG. 6, the AP may discover that the L-SIG, RL-SIG and/or U-SIG error in the second 20 MHz subchannel for STA1, which may be punctured.

Under another proposed scheme with respect to auto-detection of downsized RU/MRU, an AP may compare the RSSI to a targeted RSSI of each 20 MHz subchannel with a threshold in determining which subchannel is punctured. Using scenario 600 as an example, the AP may trigger two STAs (e.g., STA1 and STA2) for UL OFDMA transmissions. Here, STA1 may be assigned with a first 80 MHz (e.g., the first 996-tone RU) and STA2 may be assigned with a second 80 MHz (e.g., the second 996-tone RU). STA1 may transmit an EHT TB PPDU on a downsized (242+484)-tone MRU. The AP may compare the RSSI to the targeted RSSI of each 20 MHz subchannel and determine that the second 20 MHz subchannel has no signal, thereby deducing that the second 20 MHz subchannel for STA1 may be punctured.

Under yet another proposed scheme with respect to auto-detection of downsized RU/MRU, an AP may detect downsized RU/MRU using the EHT short training field (EHT-STF) and/or EHT long training fields (EHT-LTFs) in a preamble. Under the proposed scheme, in case that a STA downsized its RU/MRU, the subcarriers in the EHT-STF and/or EHT-LTFs corresponding to the punctured 20 MHz subchannel(s) may not be present. The AP may compare the received power on subcarriers in each 20 MHz subchannel to a targeted RSSI to identify the punctured 20 MHz subchannel(s). For UL multi-user multiple-input-and-multiple-output (MU-MIMO), the AP may compare the received power of the spatial streams assigned to each STA on subcarriers in each 20 MHz subchannel to identify the punctured 20 MHz subchannel(s) for the STA.

It is noteworthy that some or all of the above-described auto-detection schemes may be utilized together to enhance performance in auto-detection. Additionally, a transmission (TX) capability element for support of downsized RU/MRU may be defined for non-AP STAs. Moreover, the AP may transmit a trigger frame that contains an indication that RU/MRU downsizing is allowed/enabled or not for each assigned RU/MRU.

Under a proposed scheme with respect to STA explicit signaling of downsized RU/MRU, to avoid complexity in preamble processing for the AP, a STA may explicitly signal its downsized RU/MRU in a TB PPDU. For instance, a new format of EHT TB PPDU with a TB signal (TB-SIG) field may be introduced for this purpose. FIG. 7 illustrates an example design 700 under the proposed scheme. Referring to FIG. 7, in the TB-SIG field, each STA may be allocated with a set of subcarriers to carry its downsized RU/MRU information. The set of subcarriers in TB-SIG allocated for each STA may also be indicated in the trigger frame. For 4× numerology, each STA may be assigned with a 26-tone RU in the TB-SIG to carry its downsized RU/MRU information. For 1× numerology, each STA may be allocated N data tones, with N being 4 or 8 for example.

In an event that the TB-SIG symbol is 1× numerology, it may contain 48 or 52 data tones. In such cases, each STA may be allocated N data tones, with N being 4, 6, 8, 12 and so on. Under the proposed scheme, a STA may transmit TB-SIG using only tones allocated to itself and may use zero energy on data tones not allocated to it. The allocated tones in TB-SIG may be a set of contiguous tones or a set of discrete interlaced (e.g., non-contiguous) tones. The bits carried on the allocated set of tones may contain the downsized RU/MRU information for that STA.

It is noteworthy that a BQR/BSR frame or a BQRP/BSRP frame may only poll STAs one by one. As such, when there are many STAs to be polled, the efficiency in polling the STAs for the CCA status of each STA may be very low. In view of this issue, two schemes are proposed herein to address this issue.

Under a proposed scheme to enhance the efficiency of status polling, triggered OFDMA PPDU may be utilized for status report. Under the proposed scheme, a trigger frame from an AP may trigger a status report frame from each STA using UL TB PPDU with an OFDMA format on the primary 20 MHz subchannel among a plurality of subchannels. For instance, the trigger frame may trigger an UL TB OFDMA transmission from a plurality of STAs by assigning each STA a respective 26-tone RU or 52-tone RU within the primary 20 MHz. Each triggered STA may use its assigned 26-tone RU or 52-tone RU to transmit its status report which indicates status of a respective plurality of subchannels according to CCA performed by that STA.

Figure 8:
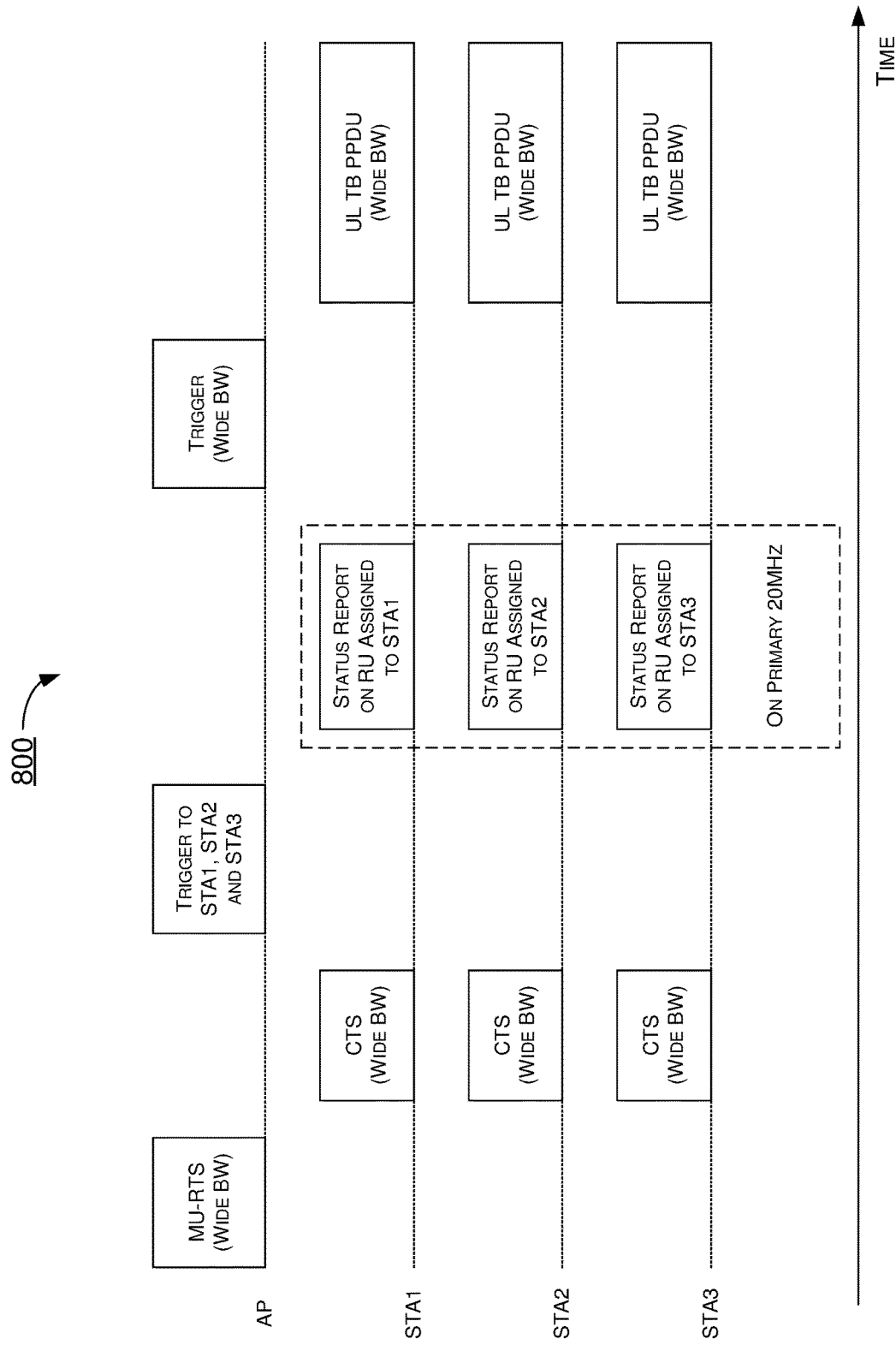
FIG. 8 is a diagram of an example scenario in accordance with an implementation of the present disclosure.

FIG. 8 illustrates an example scenario 800 of an implementation of the proposed scheme. Referring to FIG. 8, an AP transmits an MU-RTS to a plurality of STAs including STA1, STA2 and STA3 over a wide bandwidth (e.g., 80 MHz or greater). In response to receiving the MU-RTS, each of STA1, STA2 and STA3 transmits to the AP a respective CTS. Then, the AP transmits a trigger to the plurality of STAs, with the trigger assigning a respective RU/MRU to each STA. In response to receiving the trigger, each of STA1, STA2 and STA3 transmits to the AP a respective status report on its assigned RU/MRU within the primary 20 MHz subchannel. Then, the AP transmits a trigger frame over the wide bandwidth which results in each of STA1, STA2 and STA3 transmitting one or more respective UL TB PPDUs over the wide bandwidth.

Under another proposed scheme to enhance the efficiency of status polling, a new type of trigger (or polling) frame may be utilized to trigger OFDMA duplicated (OFDMA DUP) PPDU. This new type of trigger (or polling) frame may trigger a status report frame using TB PPDU with OFDMA Duplicated format on a wide bandwidth (e.g., 80 MHz or greater). The new type of trigger frame may trigger an UL TB OFDMA transmission to a plurality of STAs by assigning each STA a 26-tone RU or 52-tone RU within a primary 20 MHz bandwidth. Each triggered STA may respond with a status report, including CCA status, using the assigned 26-tone RU or 52-tone RU within the primary 20 MHz. Each triggered STA may duplicate the waveform of the primary 20 MHz over the entire bandwidth without puncturing 20 MHz subchannel(s) in an event that CCA of one or more 20 MHz subchannels is not clear. Under the proposed scheme, MU-RTS/CTS may be unnecessary because the OFDMA DUP status report frame may set up the protection period for UL TB transmissions.

Figure 9:
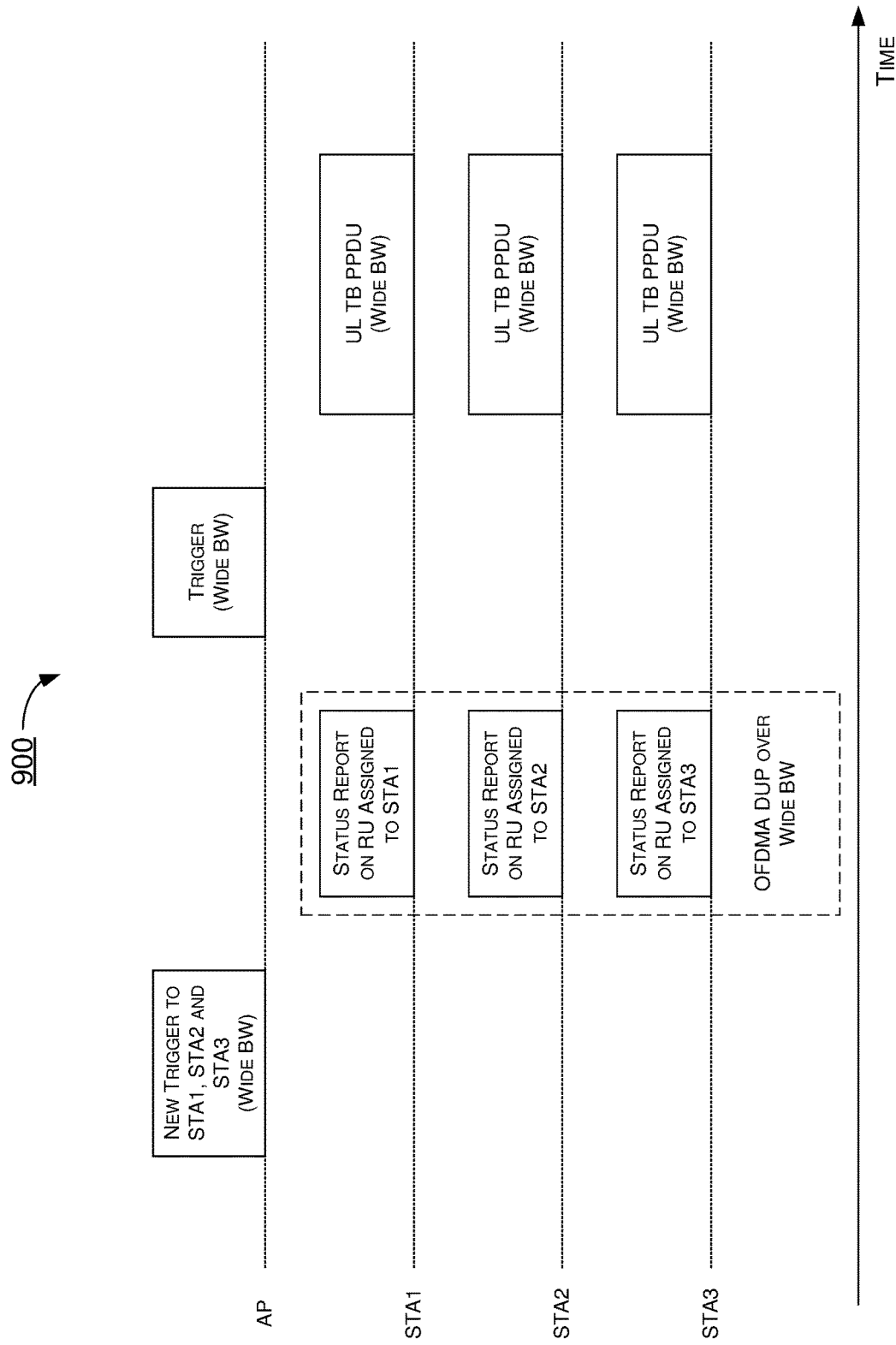
FIG. 9 is a diagram of an example scenario in accordance with an implementation of the present disclosure.

FIG. 9 illustrates an example scenario 900 of an implementation of the proposed scheme. Referring to FIG. 9, an AP transmits a new trigger to a plurality of STAs including STA1, STA2 and STA3 over a wide bandwidth (e.g., 80 MHz or greater). In response to receiving the trigger, each of STA1, STA2 and STA3 transmits to the AP a respective status report on its assigned RU/MRU. A protection period for UL TB transmissions by the STAs is set up by the OFDMA DUP status report frame. Then, the AP transmits a trigger frame over the wide bandwidth which results in each of STA1, STA2 and STA3 transmitting one or more respective UL TB PPDUs over the wide bandwidth.

Figure 10:
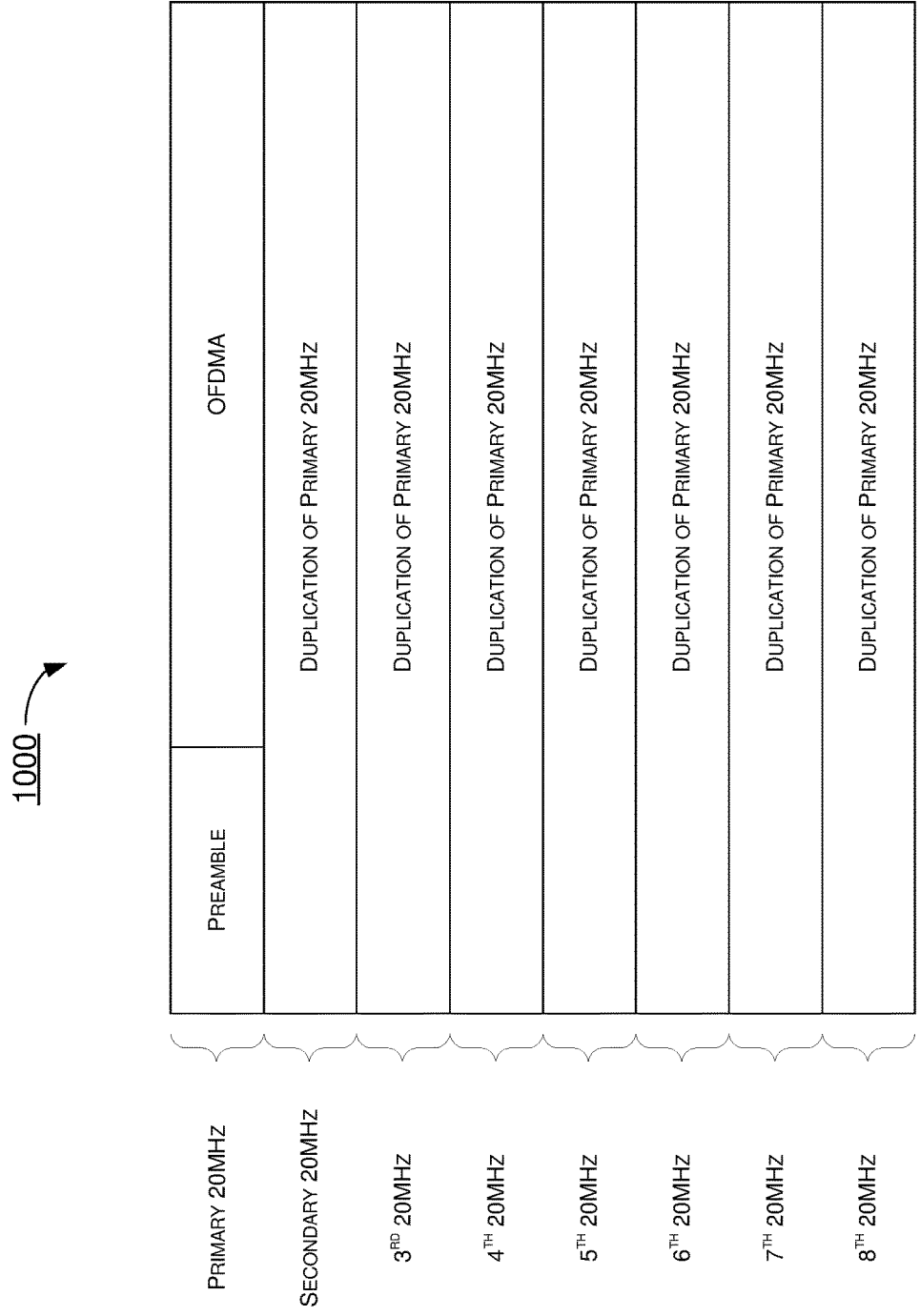
FIG. 10 is a diagram of an example scenario in accordance with an implementation of the present disclosure.

FIG. 10 illustrates an example scenario 1000 of an implementation of the proposed scheme. Referring to FIG. 10, an OFDMA DUP PPDU may be an OFDMA PPDU duplicating the primary 20 MHz subchannel over each 20 MHz subchannel of the wide bandwidth. Each 20 MHz may be used by multiple users (or STAs) using OFDMA format. For instance, each user may be assigned the same 26-tone RU in each 20 MHz.

Illustrative Implementations

Figure 11:
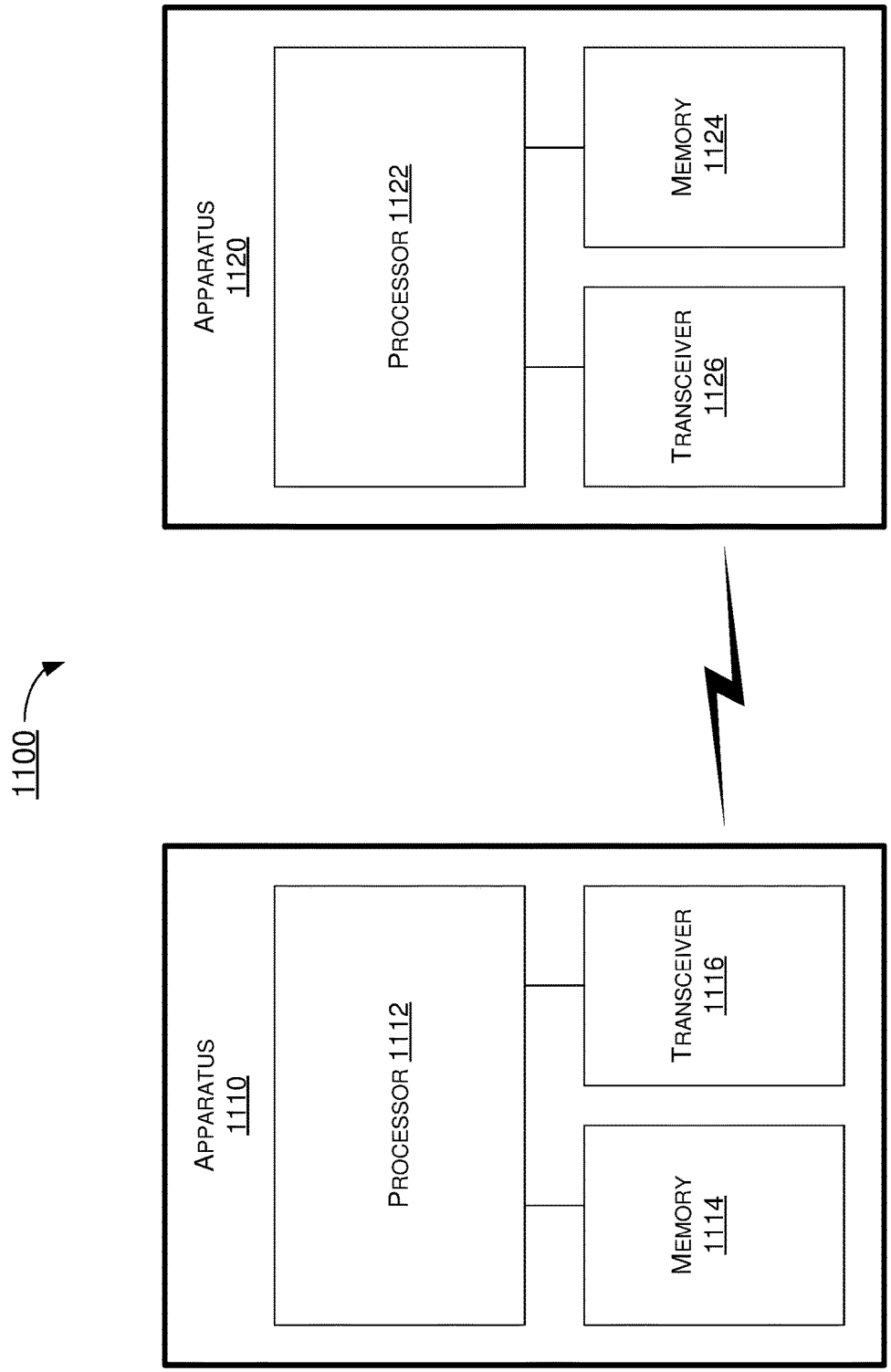
FIG. 11 is a block diagram of an example communication system in accordance with an implementation of the present disclosure.

FIG. 11 illustrates an example communication system 1100 having at least an example apparatus 1110 and an example apparatus 1120 in accordance with an implementation of the present disclosure. Each of apparatus 1110 and apparatus 1120 may perform various functions to implement schemes, techniques, processes and methods described herein pertaining to efficient TB MU UL transmissions in WLANs, including the various schemes described above with respect to various proposed designs, concepts, schemes, systems and methods described above as well as processes described below. For instance, apparatus 1110 may be an example implementation of communication entity 110, and apparatus 1120 may be an example implementation of communication entity 120.

Each of apparatus 1110 and apparatus 1120 may be a part of an electronic apparatus, which may be a STA or an AP, such as a portable or mobile apparatus, a wearable apparatus, a wireless communication apparatus or a computing apparatus. For instance, each of apparatus 1110 and apparatus 1120 may be implemented in a smartphone, a smart watch, a personal digital assistant, a digital camera, or a computing equipment such as a tablet computer, a laptop computer or a notebook computer. Each of apparatus 1110 and apparatus 1120 may also be a part of a machine type apparatus, which may be an IoT apparatus such as an immobile or a stationary apparatus, a home apparatus, a wire communication apparatus or a computing apparatus. For instance, each of apparatus 1110 and apparatus 1120 may be implemented in a smart thermostat, a smart fridge, a smart door lock, a wireless speaker or a home control center. When implemented in or as a network apparatus, apparatus 1110 and/or apparatus 1120 may be implemented in a network node, such as an AP in a WLAN.

In some implementations, each of apparatus 1110 and apparatus 1120 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1110 and apparatus 1120 may be implemented in or as a STA or an AP. Each of apparatus 1110 and apparatus 1120 may include at least some of those components shown in FIG. 11 such as a processor 1112 and a processor 1122, respectively, for example. Each of apparatus 1110 and apparatus 1120 may further include one or more other components not pertinent to the proposed scheme of the present disclosure (e.g., internal power supply, display device and/or user interface device), and, thus, such component(s) of apparatus 1110 and apparatus 1120 are neither shown in FIG. 11 nor described below in the interest of simplicity and brevity.

In one aspect, each of processor 1112 and processor 1122 may be implemented in the form of one or more single-core processors, one or more multi-core processors, one or more RISC processors or one or more CISC processors. That is, even though a singular term "a processor" is used herein to refer to processor 1112 and processor 1122, each of processor 1112 and processor 1122 may include multiple processors in some implementations and a single processor in other implementations in accordance with the present disclosure. In another aspect, each of processor 1112 and processor 1122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1112 and processor 1122 is a special-purpose machine specifically designed, arranged and configured to perform specific tasks including those pertaining to efficient TB MU UL transmissions in WLANs in accordance with various implementations of the present disclosure. For instance, each of processor 1112 and processor 1122 may be configured with hardware components, or circuitry, implementing one, some or all of the examples described and illustrated herein.

In some implementations, apparatus 1110 may also include a transceiver 1116 coupled to processor 1112. Transceiver 1116 may be capable of wirelessly transmitting and receiving data. In some implementations, apparatus 1120 may also include a transceiver 1126 coupled to processor 1122. Transceiver 1126 may include a transceiver capable of wirelessly transmitting and receiving data.

In some implementations, apparatus 1110 may further include a memory 1114 coupled to processor 1112 and capable of being accessed by processor 1112 and storing data therein. In some implementations, apparatus 1120 may further include a memory 1124 coupled to processor 1122 and capable of being accessed by processor 1122 and storing data therein. Each of memory 1114 and memory 1124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1114 and memory 1124 may include a type of read-only memory (ROM) such as mask ROM, programmable ROM (PROM), erasable programmable ROM (EPROM) and/or electrically erasable programmable ROM (EEPROM). Alternatively, or additionally, each of memory 1114 and memory 1124 may include a type of non-volatile random-access memory (NVRAM) such as flash memory, solid-state memory, ferroelectric RAM (FeRAM), magnetoresistive RAM (MRAM) and/or phase-change memory.

Each of apparatus 1110 and apparatus 1120 may be a communication entity capable of communicating with each other using various proposed schemes in accordance with the present disclosure. For illustrative purposes and without limitation, a description of capabilities of apparatus 1110, as communication entity 110 implemented in or as a non-AP STA, and apparatus 1120, as communication entity 120 implemented in or as an AP STA, is provided below. It is noteworthy that, although the example implementations described below are provided in the context of WLAN, the same may be implemented in other types of networks.

Under at least some of the proposed schemes in accordance with the present disclosure with respect to efficient TB MU UL transmissions in WLANs, processor 1112 of apparatus 1110, implemented in or as a non-AP STA, may receive, via transceiver 1116, a trigger frame from apparatus 1120 as an AP STA, with the trigger frame assigning one or more RUs. Additionally, processor 1112 may perform, via transceiver 1116, a transmission to apparatus 1120 using the assigned one or more RUs corresponding to one or more subchannels of a plurality of subchannels responsive to receiving the trigger frame, with the one or more subchannels being a subset of the plurality of subchannels in an event that at least one subchannel of the plurality of subchannels is detected as being busy.

In some implementations, prior to receiving the trigger frame from the AP, processor 1112 may further perform certain operations. For instance, processor 1112 may perform, via transceiver 1116, CCA on the plurality of subchannels. Additionally, processor 1112 may receive, via transceiver 1116, a poll from apparatus 1120. Moreover, processor 1112 may transmit, via transceiver 1116, a report to apparatus 1120 responsive to receiving the poll, with the report indicating status of the plurality of subchannels according to the CCA. In some implementations, the one or more RUs may be assigned by apparatus 1120 based on the status of the plurality of subchannels according to the CCA as indicated in the report. In such cases, no RU corresponding to the at least one subchannel may be assigned responsive to the at least one subchannel being detected as being busy according to the CCA.

In some implementations, the trigger frame may indicate whether RU downsizing is enabled or otherwise allowed. Moreover, the trigger frame may also indicate a target RSSI as power control information with respect to the assigned one or more RUs.

In some implementations, in performing the transmission using the assigned one or more RUs, processor 1112 may perform the transmission with RU downsizing by transmitting a TB PPDU to apparatus 1120 on a downsized RU with the at least one subchannel punctured. In such cases, the downsized RU may be smaller than a size of the assigned one or more RUs responsive to the at least one subchannel being detected as being busy. In some implementations, the TB PPDU may contain a TB-SIG field carrying information on the RU downsizing.

In some implementations, the trigger frame may trigger an UL TB OFDMA transmission. In such cases, the assigned one or more RUs may include a 26-tone RU or 52-tone RU within a primary 20 MHz subchannel of the plurality of subchannels. Accordingly, in performing the transmission, processor 1112 may transmit a status report including CCA status using the assigned 26-tone RU or 52-tone RU. In some implementations, in performing the transmission, processor 1112 may duplicate a waveform of the primary 20 MHz subchannel over an entire bandwidth comprising the plurality of subchannels except the at least one subchannel in an event that the at least one subchannel is detected as being busy.

Under at least some of the proposed schemes in accordance with the present disclosure with respect to efficient TB MU UL transmissions in WLANs, processor 1122 of apparatus 1120, implemented in or as an AP STA, may transmit, via transceiver 1126, a trigger frame to apparatus 1110 as a STA, with the trigger frame assigning one or more RUs. Additionally, processor 1122 may receive, via transceiver 1126, a transmission from apparatus 1110 on the assigned one or more RUs corresponding to one or more subchannels of a plurality of subchannels responsive to transmitting the trigger frame, with the one or more subchannels being a subset of the plurality of subchannels in an event that at least one subchannel of the plurality of subchannels is detected as being busy.

In some implementations, prior to transmitting the trigger frame to apparatus 1110, processor 1122 may perform certain operations. For instance, processor 1122 may transmit, via transceiver 1126, a poll to apparatus 1110. Moreover, processor 1122 may receive, via transceiver 1126, a report from apparatus 1110 responsive to transmitting the poll, with the report indicating status of the plurality of subchannels according CCA performed by apparatus 1110 on the plurality of subchannels. In some implementations, the one or more RUs may be assigned by processor 1120 based on the status of the plurality of subchannels according to the CCA as indicated in the report. In such cases, no RU corresponding to the at least one subchannel may be assigned responsive to the at least one subchannel being detected as being busy according to the CCA.

In some implementations, the trigger frame may indicate whether RU downsizing is enabled or otherwise allowed. In such cases, the trigger frame may further indicate a target RSSI as power control information with respect to the assigned one or more RUs.

In some implementations, in receiving the transmission from apparatus 1110 on the assigned one or more RUs, processor 1122 may receive a TB PPDU with RU downsizing by apparatus 1110 using a downsized RU with the at least one subchannel punctured. In such cases, the downsized RU may be smaller than a size of the assigned one or more RUs responsive to the at least one subchannel being detected as being busy. In some implementations, the TB PPDU may contain a TB-SIG field carrying information on the RU downsizing.

In some implementations, the trigger frame may trigger an UL TB OFDMA transmission from apparatus 1110. In such cases, the assigned one or more RUs may include a 26-tone RU or 52-tone RU within a primary 20 MHz subchannel of the plurality of subchannels. Accordingly, in receiving the transmission, processor 1122 may receive a status report including CCA status using the assigned 26-tone RU or 52-tone RU. In some implementations, a waveform of the primary 20 MHz subchannel may be duplicated over an entire bandwidth comprising the plurality of subchannels except the at least one subchannel in an event that the at least one subchannel is detected as being busy.

In some implementations, processor 1122 may perform additional operations. For instance, processor 1122 may detect, via transceiver 1126, whether the transmission is performed by apparatus 1110 with RU downsizing by performing one or more of the following: (a) decoding either or both of a L-SIG field and a U-SIG field on each of the plurality of subchannels to check a repetition pattern, contents, and a CRC of each of the L-SIG and U-SIG; (b) comparing a RSSI of the received transmission to a target RSSI of each of the plurality of subchannels; and (c) processing either or both of an EHT-STF and one or more EHT-LTFs.

Illustrative Processes

Figure 12:
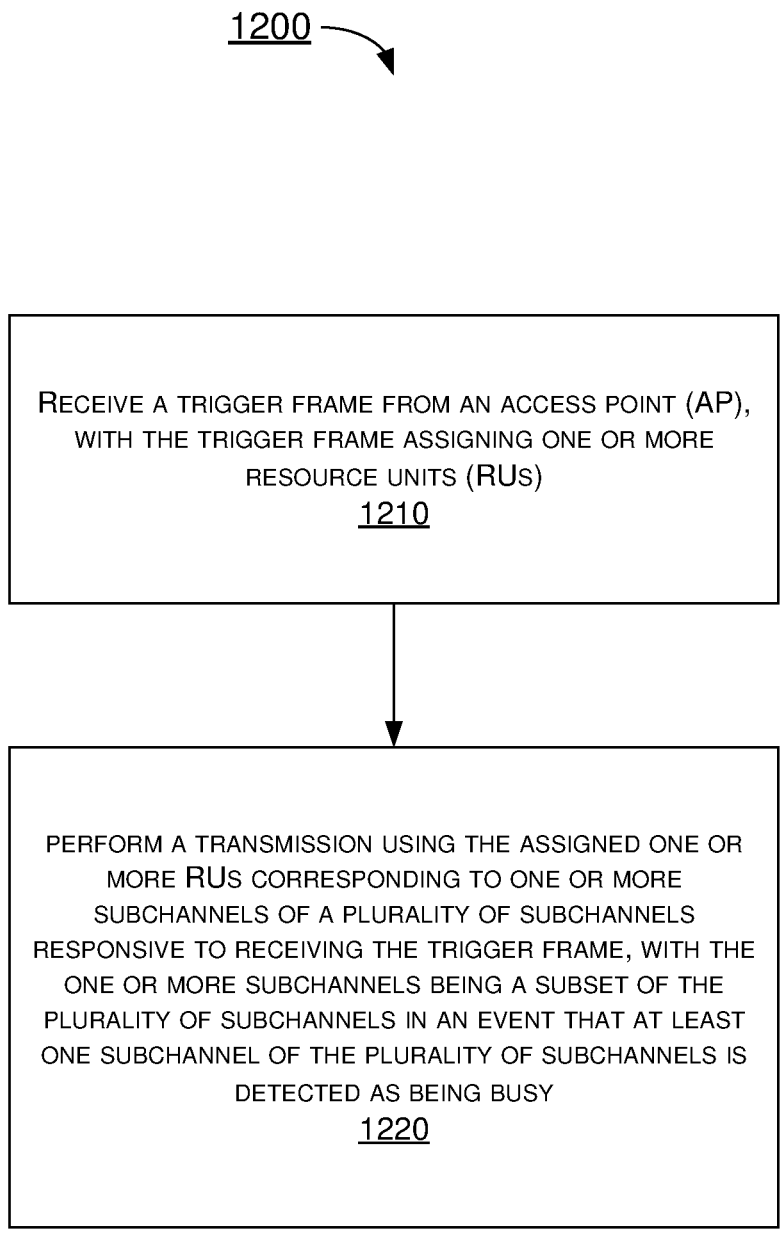
FIG. 12 is a flowchart of an example process in accordance with an implementation of the present disclosure.

FIG. 12 illustrates an example process 1200 in accordance with an implementation of the present disclosure. Process 1200 may represent an aspect of implementing various proposed designs, concepts, schemes, systems and methods described above. More specifically, process 1200 may represent an aspect of the proposed concepts and schemes pertaining to efficient TB MU UL transmissions in WLANs in accordance with the present disclosure. Process 1200 may include one or more operations, actions, or functions as illustrated by one or more of blocks 1210 and 1220. Although illustrated as discrete blocks, various blocks of process 1200 may be divided into additional blocks, combined into fewer blocks, or eliminated, depending on the desired implementation. Moreover, the blocks/sub-blocks of process 1200 may be executed in the order shown in FIG. 12 or, alternatively in a different order. Furthermore, one or more of the blocks/sub-blocks of process 1200 may be executed repeatedly or iteratively. Process 1200 may be implemented by or in apparatus 1110 and apparatus 1120 as well as any variations thereof. Solely for illustrative purposes and without limiting the scope, process 1200 is described below in the context of apparatus 1110 as communication entity 110 (e.g., a non-AP STA) and apparatus 1120 as communication entity 120 (e.g., an AP STA) of a wireless network such as a WLAN in accordance with one or more of IEEE 802.11 standards. Process 1200 may begin at block 1210.

At 1210, process 1200 may involve processor 1112 of apparatus 1110, implemented in or as a non-AP STA, receiving, via transceiver 1116, a trigger frame from apparatus 1120 as an AP STA, with the trigger frame assigning one or more RUs. Process 1200 may proceed from 1210 to 1220.

At 1220, process 1200 may involve processor 1112 performing, via transceiver 1116, a transmission to apparatus 1120 using the assigned one or more RUs corresponding to one or more subchannels of a plurality of subchannels responsive to receiving the trigger frame, with the one or more subchannels being a subset of the plurality of subchannels in an event that at least one subchannel of the plurality of subchannels is detected as being busy.

In some implementations, prior to receiving the trigger frame from the AP, process 1200 may further involve processor 1112 performing certain operations. For instance, process 1200 may involve processor 1112 performing, via transceiver 1116, CCA on the plurality of subchannels. Additionally, process 1200 may involve processor 1112 receiving, via transceiver 1116, a poll from apparatus 1120. Moreover, process 1200 may involve processor 1112 transmitting, via transceiver 1116, a report to apparatus 1120 responsive to receiving the poll, with the report indicating status of the plurality of subchannels according to the CCA. In some implementations, the one or more RUs may be assigned by apparatus 1120 based on the status of the plurality of subchannels according to the CCA as indicated in the report. In such cases, no RU corresponding to the at least one subchannel may be assigned responsive to the at least one subchannel being detected as being busy according to the CCA.

In some implementations, the trigger frame may indicate whether RU downsizing is enabled or otherwise allowed. Moreover, the trigger frame may also indicate a target RSSI as power control information with respect to the assigned one or more RUs.

In some implementations, in performing the transmission using the assigned one or more RUs, process 1200 may involve processor 1112 performing the transmission with RU downsizing by transmitting a TB PPDU to apparatus 1120 on a downsized RU with the at least one subchannel punctured. In such cases, the downsized RU may be smaller than a size of the assigned one or more RUs responsive to the at least one subchannel being detected as being busy. In some implementations, the TB PPDU may contain a TB-SIG field carrying information on the RU downsizing.

In some implementations, the trigger frame may trigger an UL TB OFDMA transmission. In such cases, the assigned one or more RUs may include a 26-tone RU or 52-tone RU within a primary 20 MHz subchannel of the plurality of subchannels. Accordingly, in performing the transmission, process 1200 may involve processor 1112 transmitting a status report including CCA status using the assigned 26-tone RU or 52-tone RU. In some implementations, in performing the transmission, process 1200 may further involve processor 1112 duplicating a waveform of the primary 20 MHz subchannel over an entire bandwidth comprising the plurality of subchannels except the at least one subchannel in an event that the at least one subchannel is detected as being busy.

Figure 13:
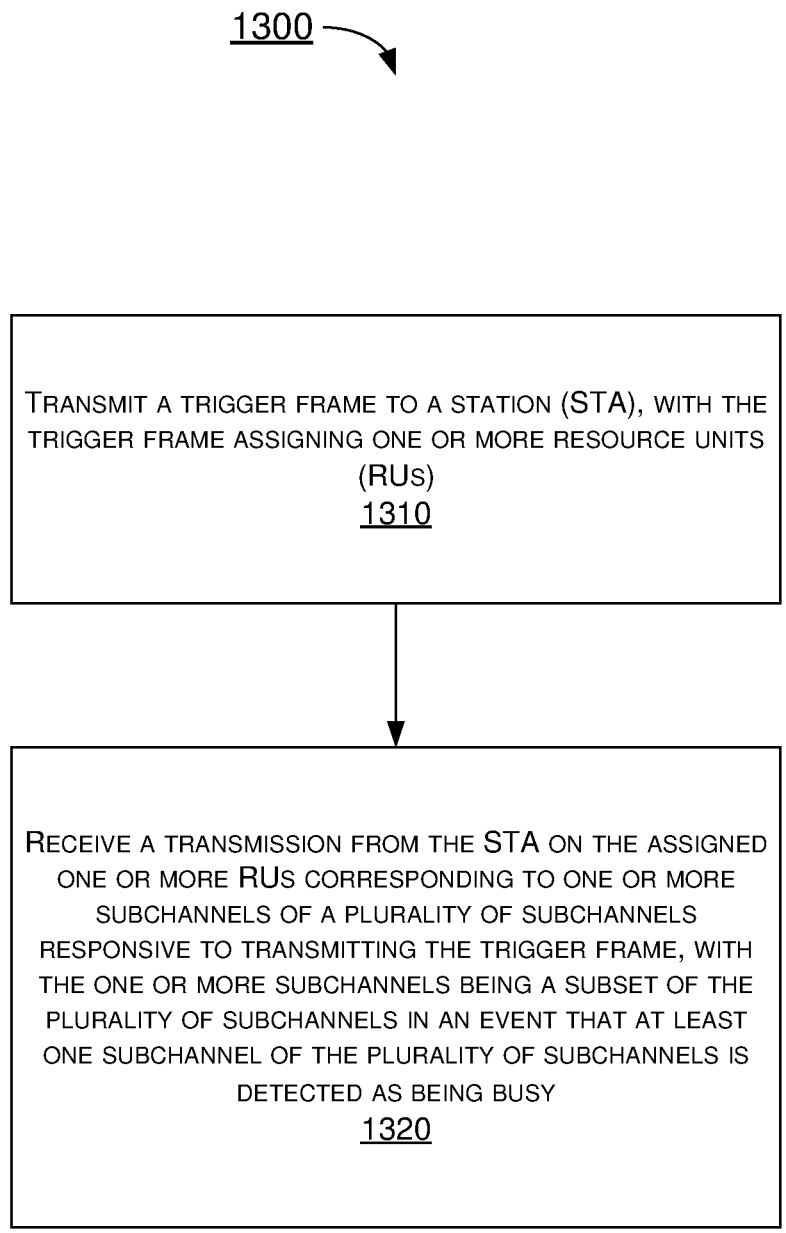
FIG. 13 is a flowchart of an example process in accordance with an implementation of the present disclosure.

FIG. 13 illustrates an example process 1300 in accordance with an implementation of the present disclosure. Process 1300 may represent an aspect of implementing various proposed designs, concepts, schemes, systems and methods described above. More specifically, process 1300 may represent an aspect of the proposed concepts and schemes pertaining to efficient TB MU UL transmissions in WLANs in accordance with the present disclosure. Process 1300 may include one or more operations, actions, or functions as illustrated by one or more of blocks 1310 and 1320. Although illustrated as discrete blocks, various blocks of process 1300 may be divided into additional blocks, combined into fewer blocks, or eliminated, depending on the desired implementation. Moreover, the blocks/sub-blocks of process 1300 may be executed in the order shown in FIG. 13 or, alternatively in a different order. Furthermore, one or more of the blocks/sub-blocks of process 1300 may be executed repeatedly or iteratively. Process 1300 may be implemented by or in apparatus 1110 and apparatus 1120 as well as any variations thereof. Solely for illustrative purposes and without limiting the scope, process 1300 is described below in the context of apparatus 1110 as communication entity 120 (e.g., a non-AP STA) and apparatus 1120 as communication entity 120 (e.g., an AP STA) of a wireless network such as a WLAN in accordance with one or more of IEEE 802.11 standards. Process 1300 may begin at block 1310.

At 1310, process 1300 may involve processor 1122 of apparatus 1120, implemented in or as communication entity 120, transmitting, via transceiver 1126, a trigger frame to apparatus 1110 as a STA, with the trigger frame assigning one or more RUs. Process 1300 may proceed from 1310 to 1320.

At 1320, process 1300 may involve processor 1122 receiving, via transceiver 1126, a transmission from apparatus 1110 on the assigned one or more RUs corresponding to one or more subchannels of a plurality of subchannels responsive to transmitting the trigger frame, with the one or more subchannels being a subset of the plurality of subchannels in an event that at least one subchannel of the plurality of subchannels is detected as being busy.

In some implementations, prior to transmitting the trigger frame to apparatus 1110, process 1300 may involve processor 1122 performing certain operations. For instance, process 1300 may involve processor 1122 transmitting, via transceiver 1126, a poll to apparatus 1110. Moreover, process 1300 may involve processor 1122 receiving, via transceiver 1126, a report from apparatus 1110 responsive to transmitting the poll, with the report indicating status of the plurality of subchannels according CCA performed by apparatus 1110 on the plurality of subchannels. In some implementations, the one or more RUs may be assigned by processor 1120 based on the status of the plurality of subchannels according to the CCA as indicated in the report. In such cases, no RU corresponding to the at least one subchannel may be assigned responsive to the at least one subchannel being detected as being busy according to the CCA.

In some implementations, the trigger frame may indicate whether RU downsizing is enabled or otherwise allowed. In such cases, the trigger frame may further indicate a target RSSI as power control information with respect to the assigned one or more RUs.

In some implementations, in receiving the transmission from apparatus 1110 on the assigned one or more RUs, process 1300 may involve processor 1122 receiving a TB PPDU with RU downsizing by apparatus 1110 using a downsized RU with the at least one subchannel punctured. In such cases, the downsized RU may be smaller than a size of the assigned one or more RUs responsive to the at least one subchannel being detected as being busy. In some implementations, the TB PPDU may contain a TB-SIG field carrying information on the RU downsizing.

In some implementations, the trigger frame may trigger an UL TB OFDMA transmission from apparatus 1110. In such cases, the assigned one or more RUs may include a 26-tone RU or 52-tone RU within a primary 20 MHz subchannel of the plurality of subchannels. Accordingly, in receiving the transmission, process 1300 may involve processor 1122 receiving a status report including CCA status using the assigned 26-tone RU or 52-tone RU. In some implementations, a waveform of the primary 20 MHz subchannel may be duplicated over an entire bandwidth comprising the plurality of subchannels except the at least one subchannel in an event that the at least one subchannel is detected as being busy.

In some implementations, process 1300 may involve processor 1122 performing additional operations. For instance, process 1300 may involve processor 1122 detecting, via transceiver 1126, whether the transmission is performed by apparatus 1110 with RU downsizing by performing one or more of the following: (a) decoding either or both of a L-SIG field and a U-SIG field on each of the plurality of subchannels to check a repetition pattern, contents, and a CRC of each of the L-SIG and U-SIG; (b) comparing a RSSI of the received transmission to a target RSSI of each of the plurality of subchannels; and (c) processing either or both of an EHT-STF and one or more EHT-LTFs.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving a trigger frame from an access point (AP), with the trigger frame assigning one or more resource units (RUs); and
    performing a transmission using the assigned one or more RUs corresponding to one or more subchannels of a plurality of subchannels responsive to receiving the trigger frame,
    wherein the one or more subchannels comprise a subset of the plurality of subchannels in an event that at least one subchannel of the plurality of subchannels is detected as being busy, and
    wherein either:
        the trigger frame indicates whether RU downsizing is allowed; or
        the performing of the transmission using the assigned one or more RUs comprises performing the transmission with RU downsizing by transmitting a trigger-based (TB) physical-layer protocol data unit (PPDU) to the AP on a downsized RU.

2. The method of claim 1, prior to receiving the trigger frame from the AP, further comprising:
    performing clear channel assessment (CCA) on the plurality of subchannels;
    receiving a poll from the AP; and
    transmitting a report to the AP responsive to receiving the poll, with the report indicating status of the plurality of subchannels according to the CCA.

3. The method of claim 2, wherein the one or more RUs are assigned based on the status of the plurality of subchannels according to the CCA as indicated in the report, and wherein no RU corresponding to the at least one subchannel is assigned responsive to the at least one subchannel being detected as being busy according to the CCA.

4. The method of claim 1, wherein the trigger frame further indicates a target received signal strength indicator (RSSI) as power control information with respect to the assigned one or more RUs.

5. The method of claim 1, wherein the downsized RU is smaller than a size of the assigned one or more RUs responsive to the at least one subchannel being detected as being busy.

6. The method of claim 5, wherein the TB PPDU contains a trigger-based signal (TB-SIG) field carrying information on the RU downsizing.

7. The method of claim 1, wherein the trigger frame triggers an uplink (UL) trigger-based (TB) orthogonal frequency-division multiple access (OFDMA) transmission, wherein the assigned one or more RUs comprise a 26-tone RU or 52-tone RU within a primary 20 MHz subchannel of the plurality of subchannels, and wherein the performing of the transmission comprises transmitting a status report including clear channel assessment (CCA) status using the assigned 26-tone RU or 52-tone RU.

8. The method of claim 7, wherein the performing of the transmission further comprises duplicating a waveform of the primary 20 MHz subchannel over an entire bandwidth comprising the plurality of subchannels except the at least one subchannel in an event that the at least one subchannel is detected as being busy.

9. A method, comprising:
  transmitting a trigger frame to a station (STA), with the trigger frame assigning one or more resource units (RUs); and
  receiving a transmission from the STA on the assigned one or more RUs corresponding to one or more subchannels of a plurality of subchannels responsive to transmitting the trigger frame,
  wherein the one or more subchannels comprise a subset of the plurality of subchannels in an event that at least one subchannel of the plurality of subchannels is detected as being busy, and
  wherein either:
    the trigger frame indicates whether RU downsizing is allowed; or
    the receiving of the transmission from the STA on the assigned one or more RUs comprises receiving a trigger-based (TB) physical-layer protocol data unit (PPDU) with RU downsizing by the STA using a downsized RU.

10. The method of claim 9, prior to transmitting the trigger frame to the STA, further comprising:
  transmitting a poll to the STA; and
  receiving a report from the STA responsive to transmitting the poll, with the report indicating status of the plurality of subchannels according to clear channel assessment (CCA) performed by the STA on the plurality of subchannels.

11. The method of claim 10, wherein the one or more RUs are assigned based on the status of the plurality of subchannels according to the CCA as indicated in the report, and wherein no RU corresponding to the at least one subchannel is assigned responsive to the at least one subchannel being detected as being busy according to the CCA.

12. The method of claim 9, wherein the trigger frame further indicates a target received signal strength indicator (RSSI) as power control information with respect to the assigned one or more RUs.

13. The method of claim 9, wherein the downsized RU is smaller than a size of the assigned one or more RUs responsive to the at least one subchannel being detected as being busy.

14. The method of claim 13, wherein the TB PPDU contains a trigger-based signal (TB-SIG) field carrying information on the RU downsizing.

15. The method of claim 9, wherein the trigger frame triggers an uplink (UL) trigger-based (TB) orthogonal frequency-division multiple access (OFDMA) transmission from the STA, wherein the assigned one or more RUs comprise a 26-tone RU or 52-tone RU within a primary 20 MHz subchannel of the plurality of subchannels, and wherein the receiving of the transmission comprises receiving a status report including clear channel assessment (CCA) status using the assigned 26-tone RU or 52-tone RU.

16. The method of claim 15, wherein a waveform of the primary 20 MHz subchannel is duplicated over an entire bandwidth comprising the plurality of subchannels except the at least one subchannel in an event that the at least one subchannel is detected as being busy.

17. The method of claim 9, further comprising:
  detecting whether the transmission is performed by the STA with RU downsizing by performing one or more of:
    decoding either or both of a legacy signal (L-SIG) field and a universal signal (U-SIG) field on each of the plurality of subchannels to check a repetition pattern, contents, and a cyclic redundancy check (CRC) of each of the L-SIG and U-SIG;
    comparing a received signal strength indicator (RSSI) of the received transmission to a target RSSI of each of the plurality of subchannels; and
    processing either or both of an extremely-high-throughput short training field (EHT-STF) and one or more extremely-high-throughput long training field (EHT-LTFs).

18. An apparatus, comprising:
  a transceiver configured to communicate wirelessly; and
  a processor coupled to the transceiver and configured to perform operations comprising:
    receiving, via the transceiver, a trigger frame from an access point (AP), with the trigger frame assigning one or more resource units (RUs); and
    performing, via the transceiver, a transmission using the assigned one or more RUs corresponding to one or more subchannels of a plurality of subchannels responsive to receiving the trigger frame,
  wherein the one or more subchannels comprise a subset of the plurality of subchannels in an event that at least one subchannel of the plurality of subchannels is detected as being busy, and
  wherein either:
    the trigger frame indicates whether RU downsizing is allowed; or
    the performing of the transmission using the assigned one or more RUs comprises performing the transmission with RU downsizing by transmitting a trigger-based (TB) physical-layer protocol data unit (PPDU) to the AP on a downsized RU.

19. The apparatus of claim 18, wherein the downsized RU is smaller than a size of the assigned one or more RUs responsive to the at least one subchannel being detected as being busy.

20. The apparatus of claim 18, wherein the trigger frame triggers an uplink (UL) trigger-based (TB) orthogonal frequency-division multiple access (OFDMA) transmission, wherein the assigned one or more RUs comprise a 26-tone RU or 52-tone RU within a primary 20 MHz subchannel of the plurality of subchannels, and wherein, in performing the transmission, the processor is configured to perform operations comprising:
  transmitting a status report including clear channel assessment (CCA) status using the assigned 26-tone RU or 52-tone RU; and
  duplicating a waveform of the primary 20 MHz subchannel over an entire bandwidth comprising the plurality of subchannels except the at least one subchannel in an event that the at least one subchannel is detected as being busy.

* * * * *